United States Patent
Williams et al.

(10) Patent No.: US 6,844,688 B1
(45) Date of Patent: Jan. 18, 2005

(54) MULTI-WATT THZ GENERATOR

(75) Inventors: Gwyn P. Williams, Yorktown, VA (US); George R. Neil, Williamsburg, VA (US)

(73) Assignee: Southeastern Universities Research Assn., Inc., Newport News, VA (US)

(*) Notice: Subject to any disclaimer, the term of this patent is extended or adjusted under 35 U.S.C. 154(b) by 0 days.

(21) Appl. No.: 10/396,790

(22) Filed: Mar. 25, 2003

(51) Int. Cl.[7] ................................................. H05H 9/00
(52) U.S. Cl. ........................................ 315/505; 250/492.3
(58) Field of Search ............................... 315/500–507; 250/492.3, 493.1, 330, 341.1, 338.1; 385/14–17; 372/2

(56) References Cited

U.S. PATENT DOCUMENTS

| | | | | |
|---|---|---|---|---|
| 5,661,594 A | * | 8/1997 | Rhoads et al. | ............... 359/299 |
| 5,894,125 A | * | 4/1999 | Brener et al. | ............... 250/330 |
| 6,345,058 B1 | * | 2/2002 | Hartemann et al. | ............ 372/2 |
| 6,690,023 B2 | * | 2/2004 | Silivra | ..................... 250/492.3 |
| 6,753,662 B1 | * | 6/2004 | Krafft | ......................... 315/505 |
| 2002/0060299 A1 | * | 5/2002 | Silivra | ..................... 250/493.1 |

* cited by examiner

Primary Examiner—Wilson Lee

(57) ABSTRACT

Stable THz radiation in the multi-watt range, upwards of 2 watts and even up to 100 watts, is produced through the acceleration of electrons in bunches less than about 500 femtoseconds in length as measured at full width and half maximum, at relativistic speeds (>~40 MeV) and at a high repetition rate (>~5 MHz) followed by transverse acceleration thereof by a magnetic field to produce the desired THz emission as synchrotron radiation.

4 Claims, 3 Drawing Sheets

MULTI-WATT THZ GENERATOR

The United States of America may have certain rights to this invention under Management and Operating contract No. DE-AC05-84ER 40150 from the Department of Energy.

FIELD OF THE INVENTION

The present invention relates to methods and apparatus for the generation of terahertz (THz) radiation and more particularly to methods and apparatus for the generation of multi-watt such radiation.

BACKGROUND OF THE INVENTION

The THz region (1 THz=33 cm$^{-1}$ or 4 meV) lies in the far infrared spectral range where conventional thermal sources are very weak. For example, a blackbody source at 2,000° K. provides less than 1 $\mu$W per cm$^{-1}$ of spectral power density for a typical spectroscopy application. Whereas narrow band sources of such radiation have been available using free-electron laser (FEL) technology, significant advances in broadband THz sources have occurred over the past decade with the advent of coherent THz radiation emission from photocarriers in biased semiconductors. Table top systems using optical rectification of femtosecond lasers either at high repetition rates (Bonvalet, A., Joffre, M., Martin, J. L. and Migus, A., "Generation of ultrabroadband femtosecond pulses in the mid-infrared by optical rectification of 15 fs light pulses at 100 MD rate", Appl. Phys. Lett. 67, 2907–2909 (1995)) or high peak power are now routinely available.

While such prior art systems are capable of producing THz radiation and even coherent THz radiation for very brief periods of time at high power or for prolonged periods at very low power, none of the prior art systems has been capable of producing a stable THz radiation at high power, i.e. above about 2 milliwatts for any significant period of time. The specific distinctions between such prior art systems and that of the present invention are described more fully below in connection with FIGS. 1 and 2 that form part of this application.

SUMMARY OF THE INVENTION

The present invention describes a novel process for producing stable coherent THz radiation through the use of accelerated electrons. While the method may and preferably does begin with pulsed laser excitation in GaAs, it makes use of photoemission to produce bunches of free electrons in space. Using an energy recovered linac (ERL) very short electron bunches (<~500 fs) are brought to relativistic energies (~~40 MeV) in the linac and then transversely accelerated by a magnetic field to produce the desired THz emission as synchrotron radiation. Like the THz emitter described in Bonvalet et al, cited above, the electrons experience a common acceleration. If the electron bunch dimensions are small (preferably the bunch length is less than the wavelength of the radiation produced) multiparticle coherent enhancement is achieved. Thus, in accordance with the present invention, stable THz radiation in the multiwatt range, upwards of 2 watts and even up to 100 watts, is produced through the acceleration of electrons in bunches less than about 500 femtoseconds in length as measured at full width and half maximum, at relativistic speeds (>~10 MeV) and at a high repetition rate (>~5 MHz) followed by transverse acceleration thereof by a magnetic field to produce the desired THz emission as synchrotron radiation.

DETAILED DESCRIPTION

Figure 1:
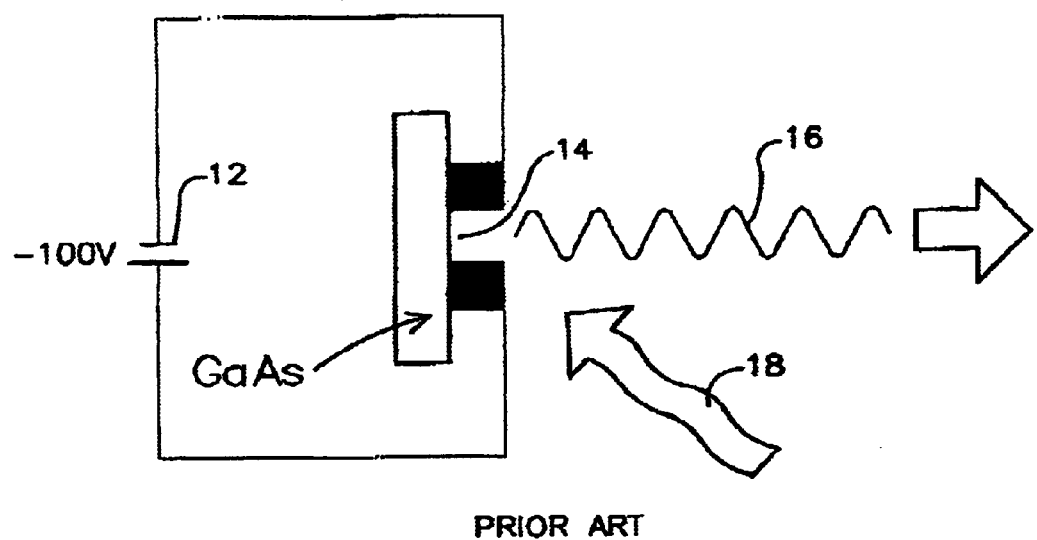
FIG. 1 is a schematic representation of a THz radiation generation system in accordance with the prior art
Figure 2:
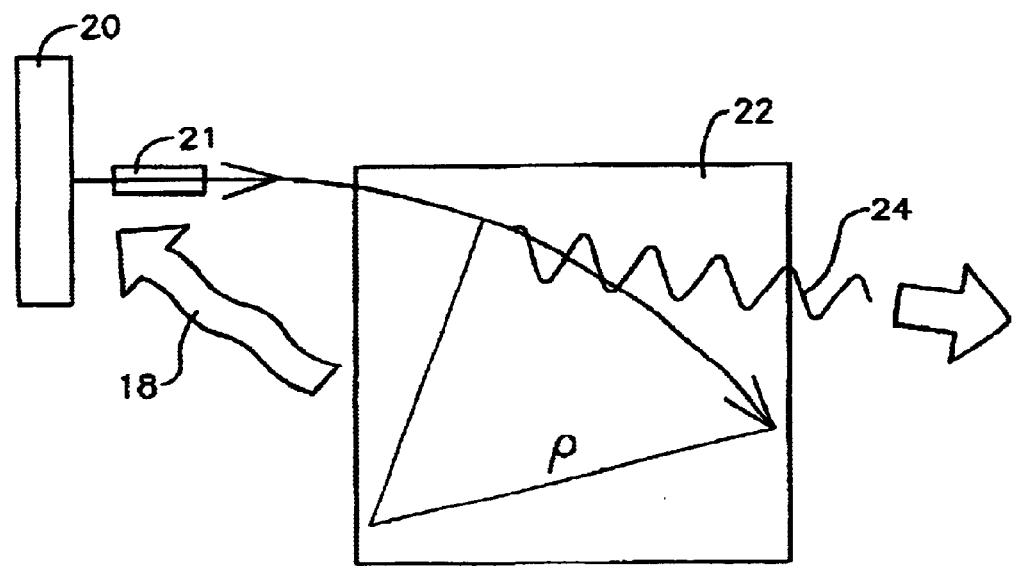
FIG. 2 is a schematic representation of a THz radiation generation system in accordance with the process of the present invention.

A comparison between coherent THz radiation generated by an 80 MHz conventional laser-driven source and the relativistic source described in the present application can be made by a comparison of the schematic drawings presented in FIGS. 1 and 2. As shown in FIG. 1, photo induced carriers 14, indicated by femtosecond laser pulses 18 immediately experience a force from bias field 12 (~100V across a 100 $\mu$m gap 14 spanned by a GaAs crystal) of ~10$^6$Vm$^{-1}$, that results in an acceleration of 10$^{17}$ ms$^{-2}$ thereby producing THz radiation 16. The entire process is completed in less than 1 picosecond, resulting in spectral content up to perhaps, at a maximum, a few THz. In the case depicted schematically in FIG. 2 that represents the process of the present invention, approximately the same number of charge carriers in a photocathode 20 are photo emitted and brought to a relativistic energy of >10 MeV in a linac 21 after which a magnetic field 22 bends their path into a circle of radius $\rho=1$, resulting in an acceleration $c^2/\rho=10^{17}$ ms$^{-2}$, the same as for the case depicted in FIG. 1 thereby producing THz radiation 24. An observer of the situation depicted in FIG. 2 would also detect a brief pulse of electromagnetic radiation as an electron bunch passed by. But in this case, two factors control the pulse duration; one factor is the bunch length and the other is the time for the relativistically compressed acceleration field from each electron to sweep past. The latter is given approximately by the formula $\delta t=4\rho(3\gamma^3 c)$, and determines the spectral range emitted by each electron. The bunch length determines the spectral range over which the coherent enhancement occurs. For an electron energy of 10 MeV ($\gamma=21$), and with $\rho=1$ m, we obtain $\delta t$ of about 500 fs, which is comparable to the bunch length. The resulting spectral content extends up to about 1 THz, the same spectral range for the case depicted in FIG. 1. With all factors except $\gamma$ the same, we see from the power equation $$P = \frac{2e^2 a^2}{3c^3}\gamma^4$$

that the power radiated by a relativistic electron exceeds that from a conventional THz emitter by a factor of $\gamma^4=21^4=2\times 10^5$.

While some linacs can create very short bunches (<1 ps) and produce coherent radiation up to a few THz, most are limited to repetition rates of a few THz, so the power is quite low. The repetition rate for storage rings is of the order of 100 MHz, but the electron bunches are significantly longer (~100 ps) owing to longitudinal damping through synchrotron radiation emission. Thus, the emission is limited to the very low frequency regime (far-infrared), or arises from instabilities that briefly modify the bunch shape.

The accelerator system at the Jefferson National Laboratory in Newport News, Va. overcomes some of the limitations of conventional linacs and storage rings being a free electron laser (FEL) driven, energy-recovered linac (ERL) as described at Neil, G. et al Sustained kilowatt lasing in a free-electron laser with same cell energy recovery. Phys.

Rev. Left. 84, 662–665 (2000). Electron bunches as short as ~500 fs or less can be produced in this facility by the standard technique of energy modulation (chirping) followed by compression in the dispersive region of a magnetic chicane as described by Yu et al in the publication, Yu, L. H Johnson, E. Li, D. and Umstader, D. Femtosecond Free-electron Laser by Chirped Pulse Amplification, Phys. Rev. E 49, 4480–4486 (1994). The time taken for an electron bunch to pass through the accelerator is less than 1 $\mu$s; thus longitudinal damping is negligible. But unlike most linacs, the aforementioned system operates at very high repetition rates (up to 75 MHz) by using superconducting radio frequency cavities and recovering the energy spent electron bunches so that the average current is orders of magnitude higher than in conventional linacs. (See Neil, G. et al Sustained kilowatt lasing in a free-electron laser with same cell energy recovery. Phys. Rev. Lett. 84, 662–665 (2000))

Using the ERL electrons were generated using the frequency doubled output of a Nd:YLF laser (model Anteres, made by Coherent) operating at, or at a sub-multiple of, 74.8 MHz, and with an average power of a few watts. Light of wavelength 530 nm was incident on a negative electron affinity Cs coated GaAs cathode. The resulting photoelectrons were accelerated using a d.c. voltage of 300 KV into a superconductiong linac, and accelerated to an energy of 40 MeV. Although the electrons are initially emitted from the cathode with a pulse of length of about 40 ps full width at half maximum, they become tightly bunched in the accelerator to pulse lengths less than 1 ps. After passing through the accelerator system, the electrons are decelerated in the same linac to an energy of 10 MeV before reaching the beam dump, thus recovering most of the beam energy. The energy recovery allows average current of up to 5 mA and electron bunches containing up to 135 pC, using an R.F. system nominally capable of accelerating only 1.1 mA beam current.

The ERL THz radiation was extracted from a dipole magnet of 1 m bending radius immediately before the FEL cavity, the latter being unimportant for this experiment. For the total power measurements, the radiation left the accelerator vacuum chamber through a 10 mm aperture diamond window subtending an angle of 20×20 mrad relative to the source point. The emerging beam was focused onto a calibrated LiTaO$_3$ pyroelectric detector, calibrated with equipment traceable to NIST. This detector had a nearly flat response (J25, Molectron) out to THz wavelengths owing to a black organic coating and a nominal responsivity of 8.83 VJ$^{-1}$ (plus or minus 2%).

The spectral content of the ERL THz radiation was analyzed using a rapid-scan Michelson interferometer (Nexus 670, Nicolet) with a silicon beamsplitter. The light was detected using a 4.2 K bolometer (Infrared Laboratories) with a 2 mm×2 mm boron doped Si composite element, fed from a 12 mm-diameter f/4 Winston cone. It was fitted with a black polyethylene filter to ensure no radiation above 600 cm$^{-1}$ was detected. The diamond window on the accelerator was replaced by a larger crystal-quartz window to increase the energy collection to 60×60 mrad. A spherical mirror of 80 cm focal length produced a 48 mm diameter collimated beam compatible with the interferometer optics. A switching mirror allowed remote choice of source, namely the THz energy from the accelerator, or a T=1,300 K thermal reference source.

For the spectroscopy experiments, the analysis and detection system did not have sufficient dynamic range to cover the seven decades in power difference between the two sources. But as mentioned earlier, the ERL THz source could be run at a precisely defined lower repetition rate. In this way, we could reduce the average power without changing the spectral content. We chose to make measurements at 584 kHz instead of 37.4 MHz and at a charge per bunch of 34 pC instead of 100 pC, thereby reducing the ERL THz power by a factor of $[(34\times10^6)/(584\times10^3)]\times(100/34)^2$, or approximately 550.

Figure 3:
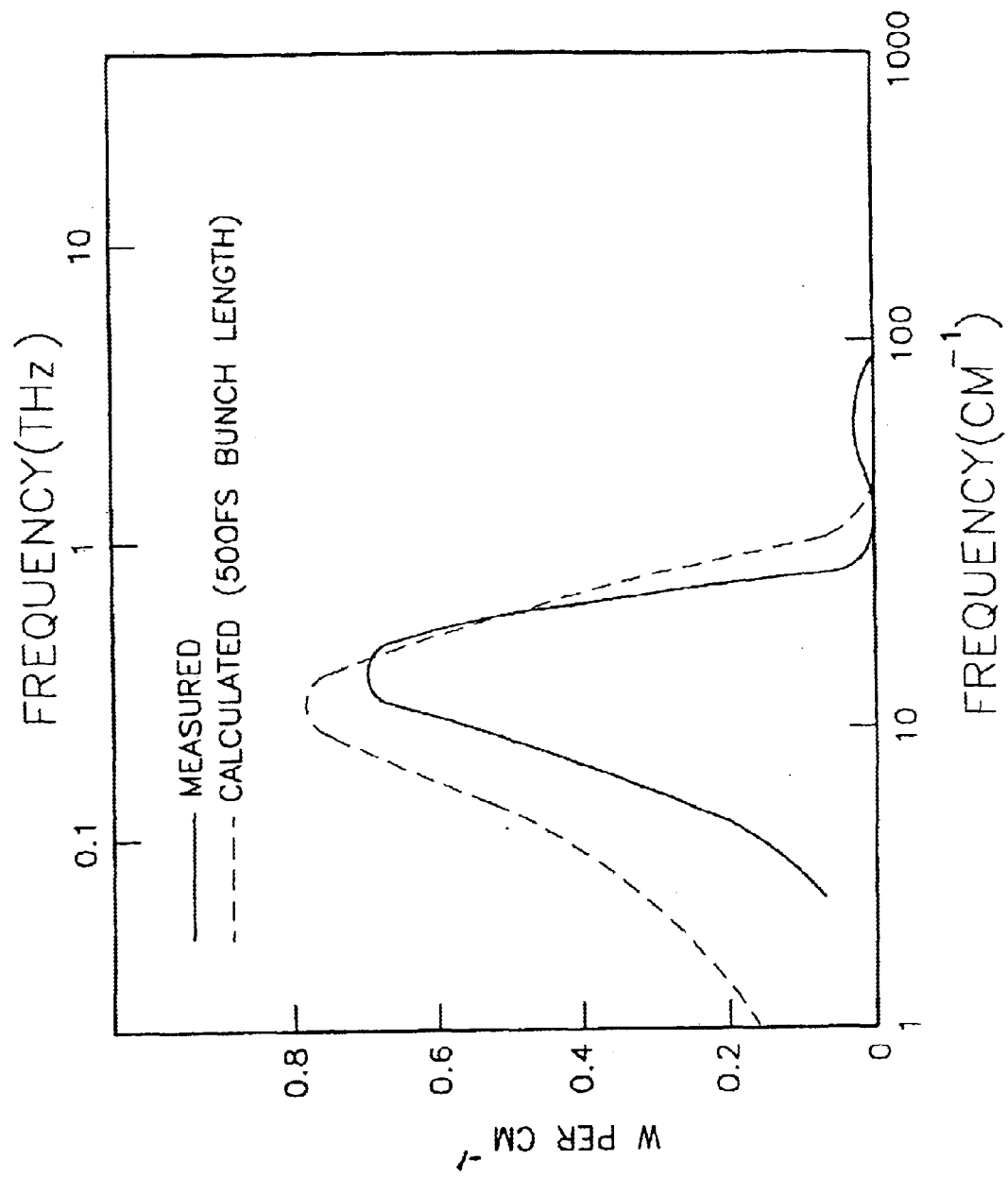
FIG. 3 shows a comparison calculated THz spectral intensity and actual measurements of spectral intensity achieved using the method of the present invention.

Another reference point for determining the absolute power was also used, since we were able to switch sources from the ERL THz emission port to a 1300 degree K thermal source (the spectrometer's standard "globar" source). This allowed us to measure the relative power using the same spectrometer and detection system. At a frequency of 12 cm$^{-1}$ we obtained a ratio of intensity from the ERL THz source to that of the globar of 2×10$^4$. To compare with the calculation, we multiply the results for the THz source by the reduction factor of 550, as discussed above. This implies a measured advantage of the ERL THz source over the globar of 10$^7$. The data from these analyses are shown in FIG. 3, and the result affirms the large ERL THz power.

Figure 4:
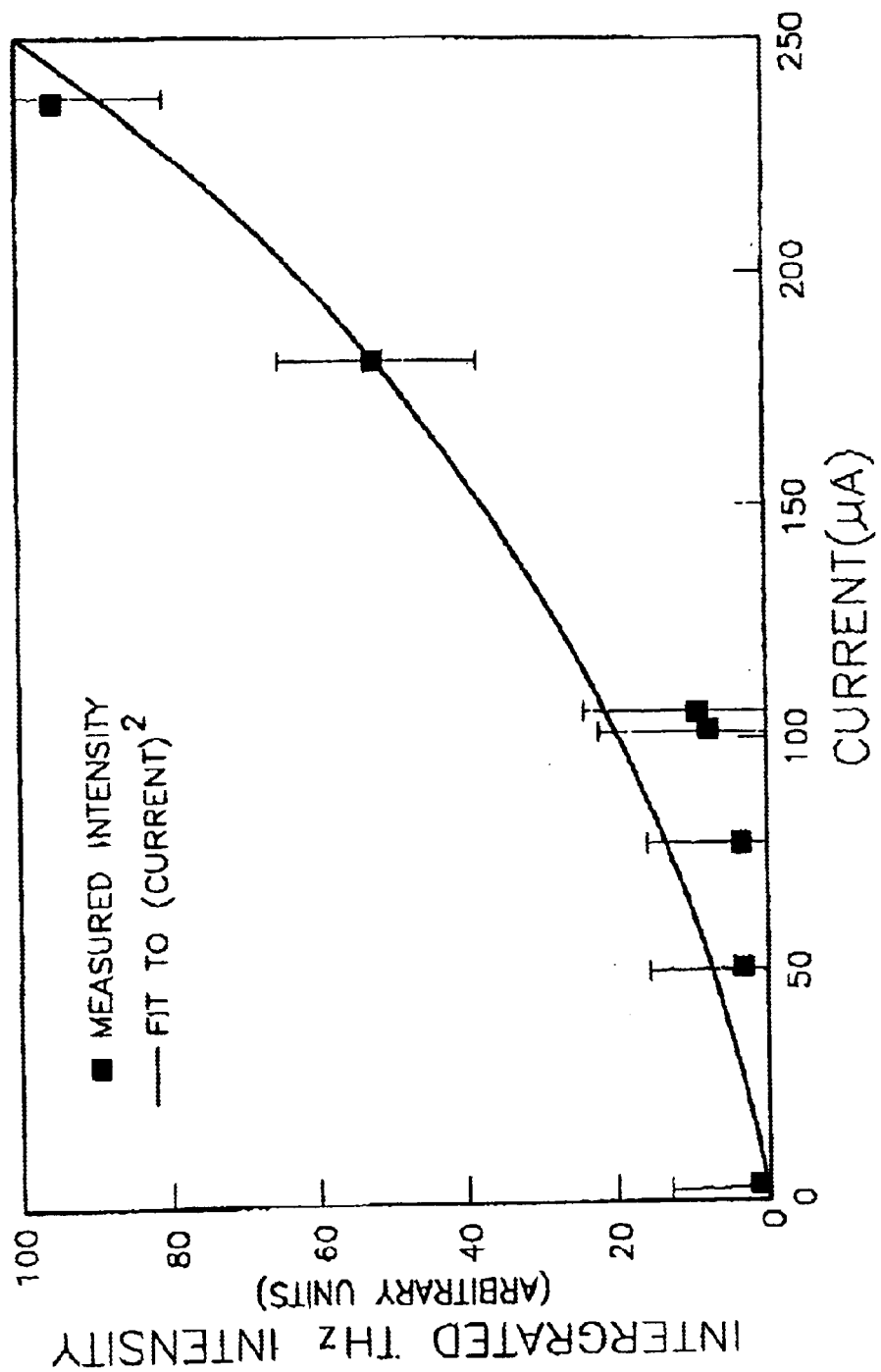
FIG. 4 shows a comparison between calculated and measured THz intensity as a function of beam current.

One additional property of super-radiant emission from electrons is the dependence of the intensity on the square of the number of particles per bunch as defined by Nodvick, S. and Saxon, D. S. Suppression of coherent radiation by electrons in a synchrotron. Phys. Rev. 96, 180–184 (1954) and Hirschmugl. C. J. Sagurton, M. S. and Williams, G. P., Multiparticle coherence calculations for synchrotron radiation emission, Phys. Rev. A44, 1316–1320 (1991). FIG. 4 shows a plot of the integrated intensity as a function of bunch charge, which shows good agreement with the N$^2$ curve.

Finally, we measured the polarization of the emitted THZ radiation. The intensity ratio for the horizontal to vertical polarization component is 3 for synchrotron radiation in the long wavelength limit. This assumes full collection of the emitted radiation. It is noted that the dominant intensity is near 30 cm$^1$, which has a natural opening angle of 86 mrad. As the emission pattern is "clipped" by the 60 mrad collection optics, the calculated ratio is expected to be higher, approaching a value of 6. Using a wire-grid polarizer placed between the Michelson modulator and the detector, we measured a ratio of 5 which is relatively good agreement for such an experimental set up.

From the foregoing, it is apparent that we have produced broadband, high-brightness, THz radiation with closest 1 W per cm$^-1$ of average spectral power density into the diffraction limit, and peak spectral densities of about 10$^4$ times higher than this.

A more comprehensive discussion of the various mathematical equations that apply to the process described herein can be found in Nature, Vol. 420, 14 Nov. 2002, pp. 153–156. Such discussion is incorporated herein in its entirety as if the entire cited publication had been reproduced herein.

As the invention has been described, it will be apparent to those skilled in the art that the same may be varied in many ways without departing from the spirit and scope of the invention. Any and all such modifications are intended to be included within the scope of the appended claims.

What is claimed is:

1. A method for the production of stable THz radiation in the multi-watt range, comprising accelerating electrons in bunches less than about 500 femtoseconds in length as measured at full width and half maximum, at relativistic energies greater than about 10 MeV and at a high repetition rate greater than about 5 MHz to produce an enhanced electron beam and magnetically bending said enhanced electron beam to extract the stable, multi-watt THZ radiation.

2. The method of claim 1 wherein said acceleration is achieved in an energy-recovered linac.

3. The method of claim 2 wherein said electrons in bunches are produced by a non-energy-recovered linac.

4. The method of claim 3 wherein said short electron bunches are brought to relativistic energies in a linac and then transversely accelerated by a magnetic field to produce the desired THz emission as synchrotron radiation.

* * * * *